United States Patent
Luksich et al.

(10) Patent No.: US 7,832,053 B1
(45) Date of Patent: Nov. 16, 2010

(54) HINGE ASSEMBLY FOR WIRELESS COMMUNICATION DEVICE

(75) Inventors: Eric Luksich, San Diego, CA (US); Michael Hidock, San Diego, CA (US); Brian Lucas Kash, San Diego, CA (US)

(73) Assignee: Kyocera Corporation, Kyoto (JP)

( * ) Notice: Subject to any disclaimer, the term of this patent is extended or adjusted under 35 U.S.C. 154(b) by 456 days.

(21) Appl. No.: 11/936,505

(22) Filed: Nov. 7, 2007

Related U.S. Application Data

(63) Continuation-in-part of application No. 29/249,577, filed on Oct. 12, 2006, now Pat. No. Des. 564,484.

(51) Int. Cl.
*E05F 1/08* (2006.01)

(52) U.S. Cl. .................. 16/285; 16/307; 455/575.3; 379/433.13

(58) Field of Classification Search .............. 16/303, 16/330, 256, 285, 307, 321; 455/575.3; 379/433.13; 361/679.27; 248/922
See application file for complete search history.

(56) References Cited

U.S. PATENT DOCUMENTS

| 294,746 | A * | 3/1884 | Straup et al. ............ 16/330 |
| 4,258,601 | A | 3/1981 | Tanabe |
| 5,864,929 | A | 2/1999 | Sakong |
| 6,239,759 | B1 | 5/2001 | Appelkvist et al. |
| 6,460,221 | B1 * | 10/2002 | Eromaki ................. 16/286 |
| 6,486,842 | B2 | 11/2002 | Wang |
| 6,671,929 | B1 * | 1/2004 | Lu .......................... 16/342 |
| 7,121,988 | B2 | 10/2006 | Walkerdine |
| 7,639,795 | B2 * | 12/2009 | Otani et al. ........... 379/433.13 |
| 2004/0078932 | A1 * | 4/2004 | Su ............................ 16/321 |
| 2005/0132536 | A1 * | 6/2005 | Hashizume ............. 16/386 |
| 2005/0205722 | A1 | 9/2005 | Krueger |
| 2006/0108344 | A1 | 5/2006 | Kim et al. |
| 2007/0015447 | A1 | 1/2007 | Waddell |
| 2007/0032275 | A1 * | 2/2007 | Suzuki et al. ........... 455/575.3 |

FOREIGN PATENT DOCUMENTS

| JP | 2006-033172 | 2/2006 |
| JP | 2007-085466 | 4/2007 |

\* cited by examiner

*Primary Examiner*—William Miller

(57) ABSTRACT

A hinge assembly for a wireless communication device that pivotally connects a display housing member to a keypad housing member is described. The hinge assembly comprises an upper hinge arm, a lower hinge arm, and a rotating assembly. The upper hinge arm includes an upper hinge plate that is coupled to the display housing member. The lower hinge arm includes a lower hinge plate that is coupled to the keypad housing member. The rotating assembly comprises a first fastener, a second fastener and at least one conductive spring. The first fastener couples the upper hinge arm to one end of the rotating assembly. The second fastener couples the lower hinge arm to the other end of the rotating assembly. At least one conductive spring interfaces with at least one hinge end, and provides a ground path within the hinge assembly.

22 Claims, 3 Drawing Sheets

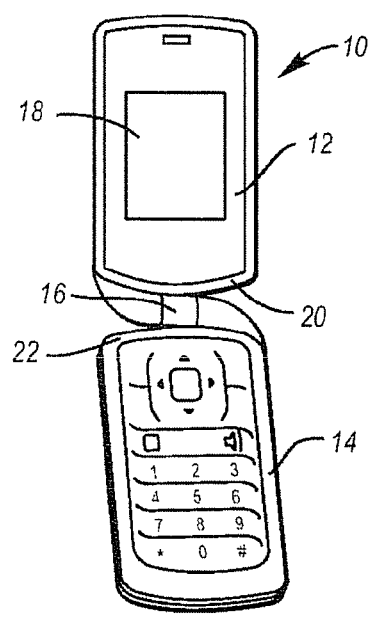
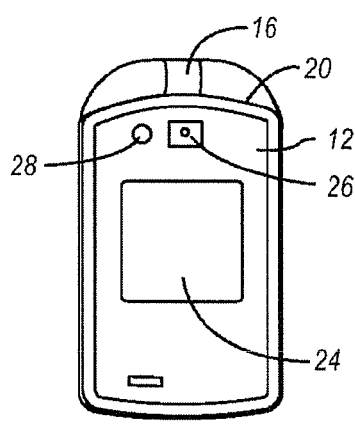
*Figure 2*
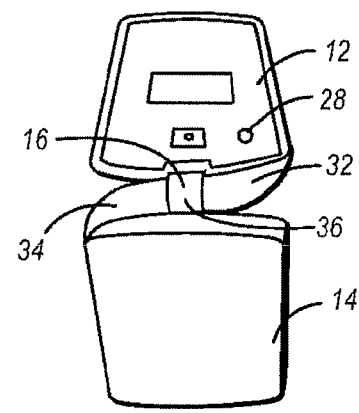
*Figure 3*
*Figure 1*
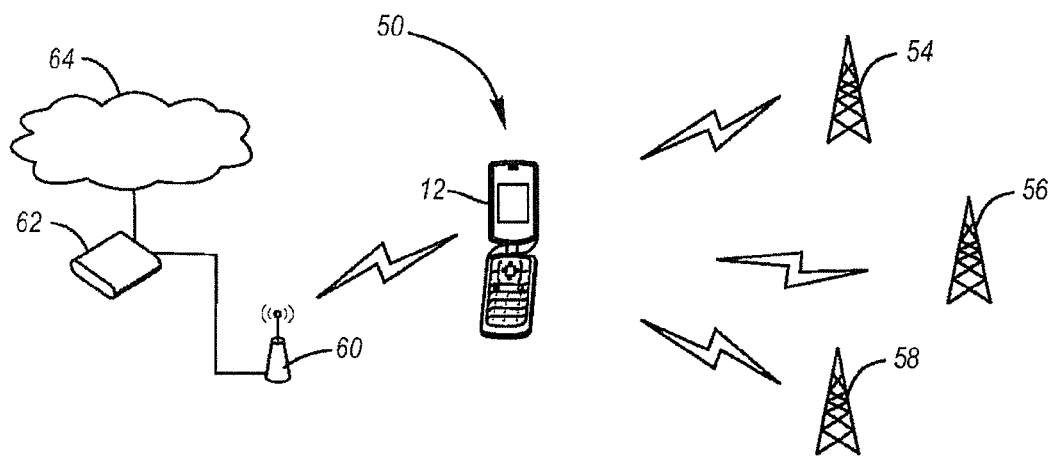
*Figure 4*

HINGE ASSEMBLY FOR WIRELESS COMMUNICATION DEVICE

CROSS REFERENCE

This application is a continuation-in-part of U.S. Design patent application 29/249,577 filed on Oct. 12, 2006, now U.S. Pat. No. D,564,484 which is hereby incorporated by reference.

FIELD OF THE INVENTION

The present invention relates to a hinge assembly for a wireless communication device. More particularly, the invention relates to a hinge assembly that pivotally connects a display housing member to a keypad housing member.

BACKGROUND

Consumers are increasingly demanding smaller feature rich wireless communication devices. One way to achieve a smaller cell phone with more functions and features is to produce a cell with two configurable housing portions. One such configuration is a flip phone that opens like a clam shell. Other configurations include sliding phones, in which one portion of the phone slides relative to another portion, and swivel phones, in which one portion of the phone swivels open in relation to the other portion of the phone.

Typically, a flip phone having a clam shell design includes a hinge. The hinge is a type of bearing that connects two solid objects and allows only a limited angle of rotation between them. Hinges are typically made of flexible materials or of moving components.

Generally, the hinge in a flip phone is used to connect a keypad housing member to a display housing member. Sometimes the keypad section is operatively coupled to the display section using a flexible printed circuit board (PCB). Additionally, the keypad section of the wireless communication device may also be operatively coupled to the display section with a wire bundles or cables. For example, in a traditional flip phone having a "clamshell" design, the display housing member is pivotally attached to a keypad housing member. Generally, the hinge extends the entire length of the edges of the housing members and pivotally connects the housing members together.

A clamshell flip phone having an S-hinge presents a variety of unique limitations that are related to the S-hinge. These challenges include proper alignment between each hinge arm and the S-hinge after repeated opening and closing of the flip phone. Yet another limitation with the S-hinge is the lack of a ground path through the S-hinge. Ground paths and their corresponding ground planes affect the performance of an antenna so that in one configuration the antenna performs optimally and in another configuration the antenna performs sub-optimally.

One attempt to overcome these challenges has been to use a glue joint to fixedly couple each hinge arm to the S-hinge. However, the glue joint has been unreliable and exhibited alignment issues. Additionally, there has been no reliable ground path through the S-hinge due to the glue joint, thereby affecting antenna performance.

SUMMARY

A hinge assembly for a wireless communication device that pivotally connects a display housing member to a keypad housing member is described. The hinge assembly comprises an upper hinge arm, a lower hinge arm, and a rotating assembly. The upper hinge arm includes an upper hinge plate that is coupled to the display housing member at a single location that is adjacent to a first edge of the display housing member. The lower hinge arm includes a lower hinge plate that is coupled to the keypad housing member at a single location that is adjacent to a first edge of the keypad housing member. The rotating assembly includes an upper hinge end that is coupled to the upper hinge arm and a lower hinge end coupled to the lower hinge arm. The rotating assembly enables the display housing member to rotate in relation to the keypad housing. The rotating assembly further comprises a first fastener, a second fastener, and at least one conductive spring. The first fastener is disposed on the upper hinge end that is fixedly coupled to the upper hinge arm and locks the rotating assembly to the upper hinge arm. The second fastener is disposed on the lower hinge end that is fixedly coupled to the lower hinge arm and locks the rotating assembly to the lower hinge arm. At least one conductive spring interfaces with at least one hinge end. The conductive spring provides a ground path between a first ground plane corresponding to the display housing member and a second ground plane corresponding to the keypad housing member.

Additionally, an S-hinge assembly for a wireless communication device that rotatably couples a display housing member to a keypad housing member is described. The S-hinge assembly comprises a curved upper hinge arm, a curved lower hinge arm, a rotating assembly and a means for enabling a ground path. The curved upper hinge arm includes an upper hinge plate that is coupled to the display housing member at a single location that is adjacent to a first edge of the display housing member. The curved lower hinge arm includes a lower hinge plate that is coupled to the keypad housing member at a single location that is adjacent to a first edge of the keypad housing member. The rotating assembly includes an upper hinge end that is coupled to the curved upper hinge arm and a lower hinge end coupled to the curved lower hinge arm. The rotating assembly enables the display housing member to rotate in relation to the keypad housing member. The rotating assembly comprises a means for fastening the upper hinge end to the upper hinge arm to lock the rotating assembly to the upper hinge arm, and a means for fastening the lower hinge end to the lower hinge arm to lock the rotating assembly to the lower hinge arm. The means for enabling a ground path provides a ground path between a first ground plane corresponding to the display housing member and a second ground plane corresponding to the keypad housing member.

Furthermore, a wireless communication device comprising a display housing, a keypad housing, and a hinge assembly is described. The display housing member comprises a first ground plane section, and the keypad housing member comprises a second ground plane section. The hinge assembly rotatably couples the display housing member to the keypad housing member. The hinge assembly further comprises an upper hinge arm, a lower hinge arm, a rotating assembly, and at least one conductive spring. The upper hinge arm includes an upper hinge plate that is fixedly coupled to the display housing member at a single location that is along a first edge of the display housing member. The lower hinge arm includes a lower hinge plate that is fixedly coupled to the keypad housing member at a single location that is along a first edge of the keypad housing member. The rotating assembly includes an upper hinge side that is coupled to the upper hinge arm and a lower hinge side coupled to the lower hinge arm. The rotating assembly enables the upper hinge arm to rotate in relation to the lower hinge arm. The rotating assembly further comprises a first fastener and a second fastener.

The first fastener is disposed on the upper hinge side that is coupled to the upper hinge arm and locks and aligns the rotating assembly to the upper hinge arm. The second fastener is disposed on the lower hinge side that is coupled to the lower hinge arm. The second fastener locks and aligns the rotating assembly to the lower hinge arm. The conductive spring applies a lateral force for aligning the rotating assembly and provides a ground path between the first ground plane section and the second ground plane section.

DRAWINGS

The present invention will be more fully understood by reference to the following drawings which are for illustrative, not limiting, purposes.

FIG. 1 shows an illustrative wireless communication device that includes an S-hinge in an open position.

FIG. 2 shows the illustrative wireless communication device of FIG. 1 in a closed position.

FIG. 3 shows the back of the illustrative wireless communication device of FIG. 1 in a partially open position.

FIG. 4 shows an illustrative communication system, in which the wireless communication device communicates using a variety of different standards.

Figure 8:
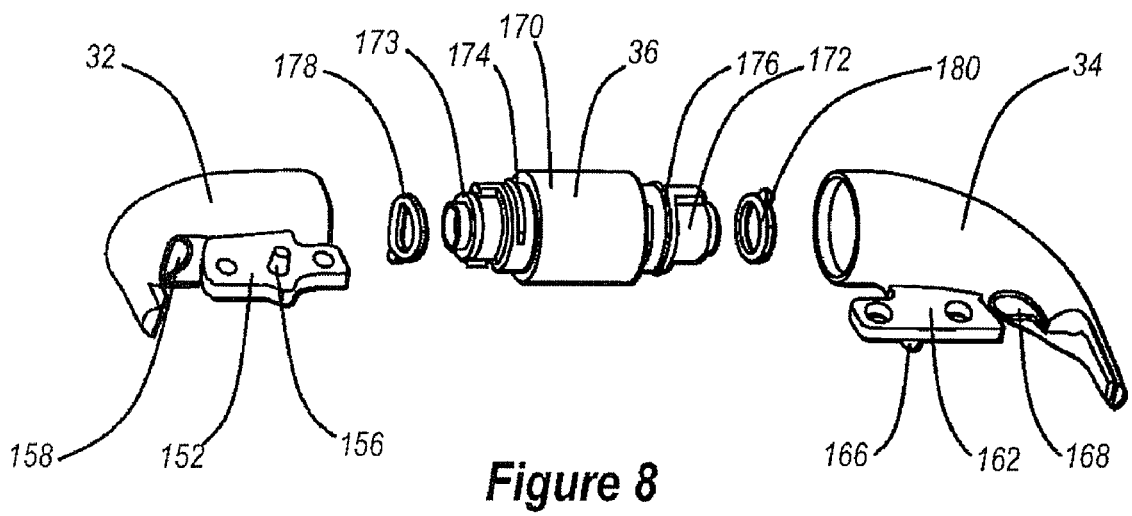

FIG. 8 provides an isometric view of the components of the S-hinge assembly.

Figure 9:
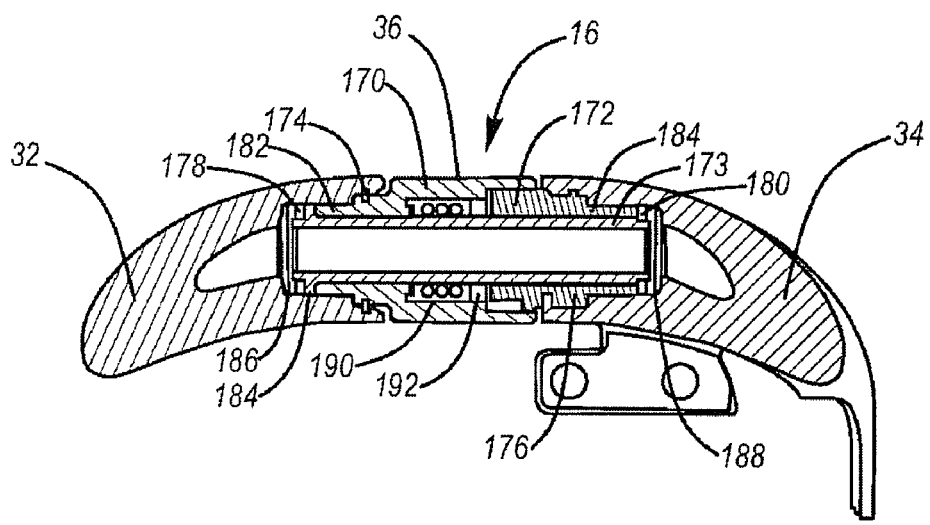

FIG. 9 provides a sectional view of the S-hinge assembly.

DETAILED DESCRIPTION

Persons of ordinary skill in the art will realize that the following description is illustrative and not in any way limiting. Other embodiments of the claimed subject matter will readily suggest themselves to such skilled persons having the benefit of this disclosure. It shall be appreciated by those of ordinary skill in the art that the systems, and devices described hereinafter may vary as to configuration and as to details. Additionally, the hinge assembly may vary as to details, the particulars of the rotation assembly, components or elements without departing from the illustrative hinge assembly disclosed herein.

The illustrative hinge assembly described herein is an S-hinge assembly. An S-shaped hinge is a design that may be used for a foldable wireless communication device. The S-shaped hinge design is a single point hinge with an articulated arm, in which the S-hinge assembly is connected to a single location in the keypad housing member and a single location for the display housing member. The S-shaped hinge has a distinctive appearance because of its articulated arm and because it provides a pivot or axis for a flip phone that permits a wire bundle to be fed through the S-hinge.

The S-hinge assembly includes a mechanical retention device for coupling a rotation assembly with mating arm members and ensuring a ground path between the arm members and rotation assembly. The illustrative design reliably couples the rotation assembly with each arm member. Additionally, the illustrative implementation ensures a ground path through the arm members and rotation assembly, thereby providing optimal antenna performance.

Referring to FIG. 1 there is shown an illustrative wireless communication device that includes an S-hinge assembly in an open position. The wireless communication device 10 includes a display housing member 12, a keypad housing member 14, and an S-hinge assembly 16. By way of example, the display housing member 12 includes a display 18 on one face of the display housing member 12. The keypad housing member 14 may include specific touch sensitive input keys such as alphanumeric keys that can be used to input numbers or letters, scrolling means, navigation keys, and soft keys that perform functions displayed near the key, or other such key arrangements.

The S-hinge assembly 16 comprises a single point hinge and an articulated arm. The connection between the S-hinge and the display housing member 12 occurs at a single point location, and not along the length of the bottom edge 20 of the display housing member 12. Similarly, each connection between the S-hinge assembly 16 and the keypad housing member 14 occurs at a single location, and not along the length of the top edge 22 of keypad housing member 14.

In operation, the wireless communication device 10 is opened by pivoting the display housing member 12 and keypad housing member 14 relative to each other about the S-hinge assembly 16. By way of example and not of limitation, this opening step may activate the wireless communication device 10 or answer an incoming call.

Referring to FIG. 2 there is shown the illustrative wireless communication device 10 of FIG. 1 in a closed position. In the closed position, the S-hinge assembly 16 and the second face of the display housing member 12 is shown. The second face of the display housing member 12 includes a second display 24, camera 26, and sensor 28 such as a light sensor. Generally, when the wireless communication device 10 is in a closed position, the wireless communication device is in an "off" position, even though the wireless communication device continues to communicate with the wireless network. The wireless communication device is closed by pivoting the display housing member 12 and keypad housing member 14 relative to one another about the S-hinge assembly 16.

Referring to FIG. 3 there is shown the back of the illustrative wireless communication device 10 of FIG. 1 in a partially open position. The S-hinge assembly 16 is more clearly visible and comprises an upper hinge arm 32 that is fixedly coupled to the display housing member 12. The upper hinge arm 32 includes an upper hinge plate (not shown) that is fixedly coupled to the display housing member 12 at a single location that is adjacent to a first edge of the display housing member 12. In the illustrative embodiment, the first edge of the display housing member 12 is adjacent to a corner and to the sensor 28.

Additionally, the S-hinge assembly also comprises a lower hinge arm that is fixedly coupled to the keypad housing member 14 with a lower hinge plate (not shown). The lower hinge arm 36 is fixedly coupled to the keypad housing member 14 at a single location that is adjacent to a first edge of the keypad housing member 14. In the illustrative embodiment, the first edge of the keypad housing member 14 is adjacent a corner that opposite to first edge of the display housing member 12. Thus, when the S-shaped hinge assembly is in an open position, the upper hinge arm 32 is anchored to one side of wireless communication device, and the lower hinge arm 34 is anchored to the opposite side of the wireless communication device 10.

Furthermore, the S-hinge assembly comprises a rotating assembly 36 that allows the lower hinge arm 34 and the upper hinge arm 32 to rotate about a pivot or axis. The rotating assembly 36 is rotatably coupled to the upper hinge arm 32 and lower hinge arm 32 as described in further detail below.

Referring now to FIG. 4 there is shown the illustrative multimode wireless communication device 10 communicating using a plurality of different communication bands. In the illustrative system 50, the wireless communication device 10 is a wireless handset that is configured to communicate with one or more base stations 54, 56 and 58 using different communication access technologies (CATs). The illustrative base stations may communicate with the wireless handset using a variety of different communication standards including, but not limited to, various forms of code division multiple access (CDMA), orthogonal frequency division multiple access (OFDMA), and time division multiple access (TDMA) wireless interfaces. By way of example and not of limitation, the wireless handset 10 communicates with base station 54 using a CAT that operates using CDMA technology at 1.9 GHz. The wireless handset 10 is also configured to communicate with base station 56 using a CAT that operates using CDMA at 800 MHz. Additionally, the illustrative handset 10 is configured to communicate with base station 58 using a CAT that operates using GSM technology at 900 MHz. The wireless handset 10 is also configured to monitor signals for a wireless local area network (WLAN) that may include a Wi-Fi access point 60 that is operatively coupled to a modem 62 that provides access to the Internet cloud 64.

The illustrative wireless communication device 10 is also referred to as a wireless handset, a mobile handset, mobile phone, wireless phone, portable cell phone, cellular phone, portable phone, a personal digital assistant (PDA), or any type of mobile terminal which is regularly carried by a user and has all the elements necessary for operation in a wireless communication system. Each CAT receiver module complies with a wireless standard having a receiver requirement. By way of example and not of limitation, the wireless standard is selected from the group of standards consisting of Code Division Multiple Access (CDMA), Global System for Mobile communications (GSM), Universal Mobile Telecommunications System (UMTS), Universal Mobile Broadband (UMB), wireless local area network (WLAN), wireless personal area network (WPAN), Mobile Broadband Wireless Access (MBWA) and Worldwide Interoperability for Microwave Access (WiMAX) or IEEE802.16. It shall be appreciated by those of ordinary skill in the art that the term wireless communication device, wireless handset, mobile handset, wireless phone, and mobile phone are interchangeable.

Figure 5:
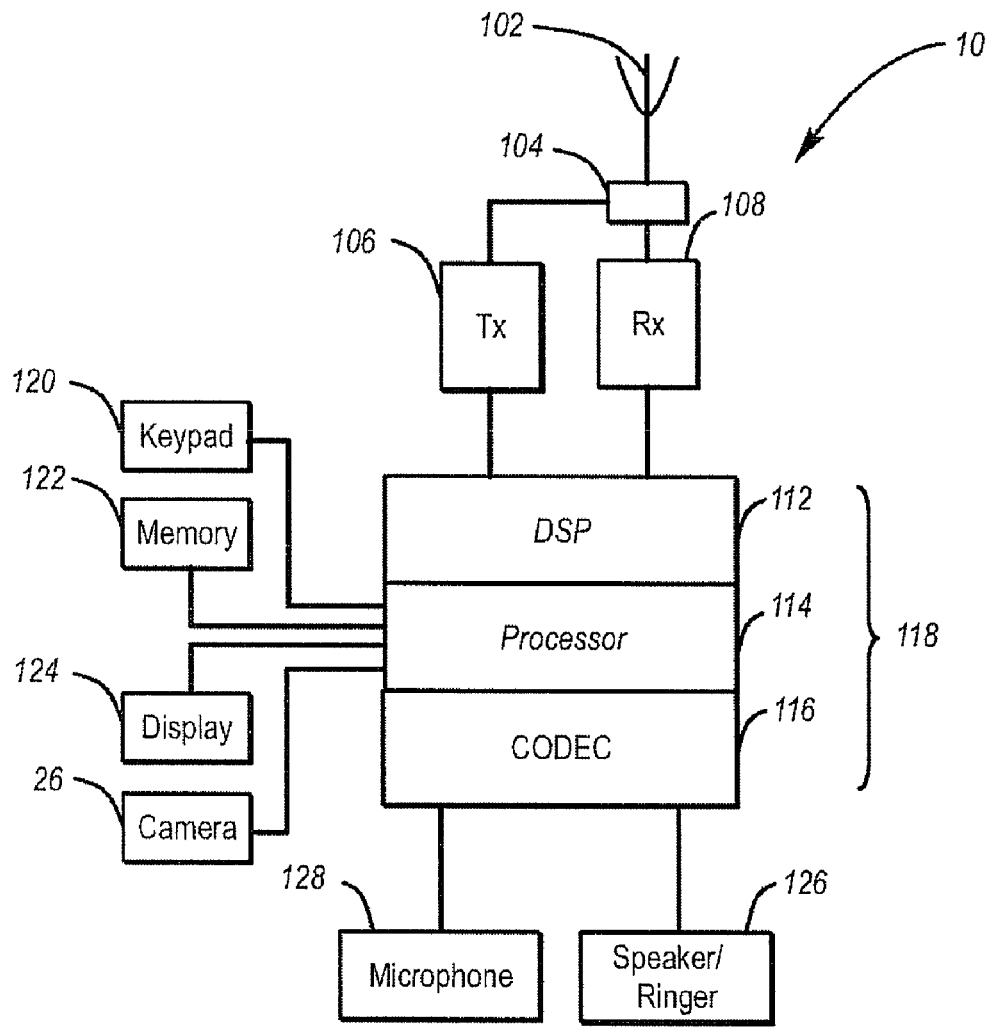
FIG. 5 shows a plurality of components associated with the illustrative wireless communication device.

Referring to FIG. 5 there is shown the electrical components for the illustrative wireless communication device 10. The illustrative multimode wireless handset 100 comprises a first antenna element 102 that is operatively coupled to a duplexer 104, which is operatively coupled to a multimode transmitter module 106, and a multimode receiver module 108. The antenna element 102 may be mounted on the display housing element 12, the keypad housing element 14, or a combination thereof.

An illustrative control module 118 comprises a digital signal processor (DSP) 112, a processor 114, and a CODEC 116 that are communicatively coupled to the transmitter 106 and receiver 108. It shall be appreciated by those of ordinary skill in the art that the transmitter module and receiver module are typically paired and may be embodied as a transceiver. Thus, the terms transmitter, receiver, and transceiver are used interchangeably herein and the distinctions shall be readily apparent to those of ordinary skill in the art.

The illustrative transmitter 106, receiver 108, or transceiver may be housed in the display housing member 12, the keypad housing member 14, or a combination thereof. The illustrative transmitter 106, receiver 108, or transceiver is communicatively coupled to antenna element 102. By way of example and not of limitation, for optimal antenna performance a ground path is needed between a ground plane associated with display housing member 12 and a ground plane associated with keypad housing member 14. There are at least two separate ground paths: the first ground path being the ground wires in the wire bundle or flexible PCB; and the second ground path being through the hinge assembly.

The DSP 112 may be configured to perform a variety of operations such as controlling the antenna 102, the multimode transmitter module 106, and the multimode receiver module 108. The processor 114 is operatively coupled to a keypad 120, a memory 122, a display 124, and camera 26. Additionally, the processor 112 is also operatively coupled to the CODEC module 114 that performs the encoding and decoding operations and is communicative coupled to a speaker or ringer 126, and a microphone 128. The CODEC module 114 is also communicatively coupled to the display 124 and provides the encoding and decoding operations for video.

Figure 6:
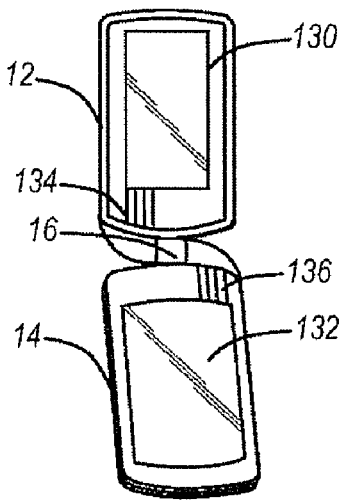
FIG. 6 shows two ground planes for the wireless communication device that are electrically coupled by the S-hinge assembly

Referring to FIG. 6, there is shown the ground paths between the two ground planes for the wireless communication device 10. The first ground plane 130 corresponds to the display housing member 12. The second ground plane 132 corresponds to keypad housing member 14. The S-hinge assembly 16 provides a reliable ground path by electrically coupling the first ground plane 130 to the second ground plane 132. A separate ground path is provided by the ground lines in the wire bundle or flexible PCB.

Figure 7:
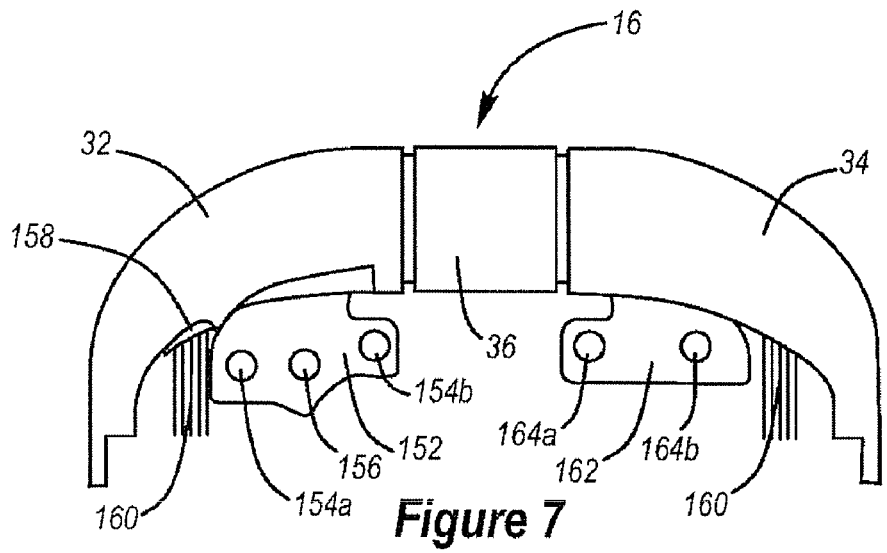
FIG. 7 shows a front view of the S-hinge assembly.

Referring to FIG. 7 there is shown a front view of the S-hinge assembly. The illustrative S-hinge assembly 16 is composed of a hard or rigid material, such as a plastic that is coated with a conductive material and includes a hollow body. The S-hinge assembly 16 comprises a curved upper hinge arm 32 that is fixedly coupled to the display housing member 12 and a curved lower hinge arm 34 that is fixedly coupled to the keypad housing member 14.

The curved upper hinge arm 32 includes an upper hinge plate 152 that further comprises apertures 154a, 154b, and a projection 156. The apertures 154a and 154b are configured to receive threaded fasteners that fixedly couple the upper hinge plate 152 to the display housing member 12. The projection 156 also interfaces with display housing member 12. In one embodiment, one or more hard resilient annular load transfer mechanisms such as annular rubber grommets circumferentially surround the shafts of the threaded fasteners (not shown). The upper hinge plate 152 is fixedly coupled to the display housing member 12 at a single location that is near or adjacent the edge of the display housing member 12.

The upper hinge arm 32 also includes an upper hinge aperture 158 that is configured to receive a wire bundle 160. The wire bundle 160 is passed through a hollow shaft (not shown) to a lower hinge aperture (not shown) in the lower hinge arm 34 that is configured to receive the wire bundle 160.

The lower hinge arm 34 comprises a lower hinge plate 162 that is fixedly coupled to the keypad housing member 14 as described above. The lower hinge plate 162 is similar to the upper hinge plate 152 and comprises apertures 164a and 164b and a projection that is not visible, but which is visible as projection 166 in FIG. 8. The apertures 164a and 164b are configured to receive threaded fasteners, e.g. screws, that fixedly couple the lower hinge plate 162 to the keypad housing member 14 and the projection also interfaces with keypad housing member 14. The lower hinge plate 162 is fixedly coupled to the keypad housing member 14 at a single location that is near or adjacent the edge of the keypad housing member 14.

The rotating assembly 36 enables the upper hinge arm 32 to rotate in relation to the lower hinge arm 34. In the illustrative example, the angle of rotation enables the wireless communication device 10 to rotate from a closed position to an open position. By way of example and not of limitation, the angle of rotation may be 165°.

Referring to FIG. 8 there is shown an isometric view of the internal components of the S-hinge assembly. The S-hinge assembly includes the rotating assembly 36 that is coupled to the upper hinge arm 32 and the lower hinge arm 34. The upper hinge arm 32 includes an upper hinge plate 152 that comprises a projection 156. The lower hinge arm 34 comprises a lower hinge plate 162 that includes a projection 166. Additionally, there is shown the upper hinge aperture 158 on the upper hinge arm 32 and lower hinge aperture 168 on the lower hinge arm 34. In the illustrative embodiment, the upper hinge aperture 158 and lower hinge aperture 168 are configured to receive a wire bundle 160 that is also passed through the shaft 173. Alternatively, the upper hinge aperture 158 and lower hinge aperture 168 may be configured to receive a flexible printed circuit board (PCB).

The upper hinge arm 32 has a hollow body and is shaped in a twisted conical shape. The twisted conical shape is defined by an arcuate twisted end that may also be referred as a "left tail" having a curve. The left tail is proximate to a localized edge associated with the display housing member 12 shown above. Additionally, the lower hinge arm 34 also has a hollow body and is shaped in a twisted conical shape that is defined by an arcuate twisted end that can also be referred to as a "right tail" with a curve. The right tail is proximate to a localized edge that corresponds to the keypad housing member 14 shown above.

The rotating assembly 36 comprises a housing 170 that interfaces with a follower 172, and a shaft 173 that interfaces with both. In the illustrative embodiment, the housing 170 and the follower 172 are coupled to shaft 173. The housing 170 comprised an upper hinge and the follower 172 comprises a lower hinge end. The rotating assembly 36 is configured to rotate from a closed position where the display housing member 12 is adjacent to the keypad housing member 14. In an open position, the display housing member 12 is separated from the keypad housing member 14. Thus, the rotating assembly 36 is configured to enable the display housing member 12 to rotate in relation to the keypad housing member 14.

A first fastener 174 is disposed on the housing 170. The first fastener 174 is coupled to upper hinge arm 32 and locks the rotating assembly 36 to the upper hinge arm 32. A second fastener 176 is disposed on the follower 172 and coupled to the lower hinge arm 34. The second fastener 176 also locks the rotating assembly 36 to the lower hinge arm 34. In the preferred embodiment, the first fastener 174 and second fastener 176 are both snap rings. A snap ring may also be referred to as a circlip and is a type of fastener that is typically a ring with open ends that can be snapped into a machined groove or similar cavity. The snap ring permits rotation but prevents lateral movement, thus the snap rings "locks" the upper hinge arm 32 and lower hinge arm 34 to the rotating assembly 36 and aligns the rotating assembly 36 to the upper hinge arm 32 and lower hinge arm 34. The snap rings may also be metallic or made of some conductive material and may be used to provide an electrical contact that electrically couples the rotating assembly 36 to the upper hinge arm 32 and lower hinge arm 34, thus providing a ground path between the first ground plane 130 and second ground plane 132 described above.

The first fastener 174 provides a means for fastening the upper hinge end of the rotating assembly 36 to lock and align the rotating assembly 36 to the upper hinge arm 32. The second fastener 176 also provides a means for fastening the lower hinge end of the rotating assembly 36 to the lower hinge arm 34 to lock and align the rotating assembly 36 to the lower hinge arm 34. The means for fastening includes the illustrative snap ring, o-ring, circlip, internal circlip, external circlip, and other such fasteners that can be used to lock and align the rotating assembly to the lower hinge arm 34 and upper hinge arm 32.

At least one spring 178 interfaces with a flange or annular rim that is associated with the shaft 173 and the upper hinge arm 32. The spring 178 is an electrically conductive spring that provides a ground path between the upper hinge arm 32 and the rotating assembly 36. In the illustrative embodiment, there is another conductive spring 180 that provides tension between follower 172 and the lower hinge arm 34. The spring 180 also provides a ground path between the rotating assembly 36 and the lower hinge arm 34. The conductive springs 178 and 180 interface with the conductive shaft 173 in the rotating assembly 36 which results in an electrical path through the rotating assembly 36. This electrical path is utilized as a ground path that electrically coupled the first ground plane 130 corresponding to the display housing member 12 to the second ground plane 132 corresponding to the keypad housing member 14. Additionally, the conductive springs 178 and 180 are configured to align the rotating assembly 36 with the upper hinge arm 32 and lower hinge arm 34.

In a preferred embodiment, two wave washers (not shown) are use for spring 178 and two more wave washers (not shown) are used for spring 180. The wave washers or wave springs occupy less space, are affordable and act as load bearing elements. Additionally, the wave washers exert a force on the respective hinge arm that results in improved alignment.

The illustrative conductive springs 178 and 180 provide a means for enabling a ground path between a first ground plane 130 corresponding to the display housing member 12 and a second ground plane 132 corresponding to the keypad housing member 14. The means for enabling a ground path requires electrically coupling the first ground plane 130 to the second ground plane 132 through the S-hinge assembly 16 as shown in FIG. 6. Thus, alternative means for enabling a ground path may include simply conductively coupling the first ground plane 130, the upper hinge arm 32, the rotating assembly 36, the lower hinge arm 34, and the second ground plane 132 for optimal antenna performance.

In FIG. 8 springs 178 and 180 are shown on opposite ends of the rotating assembly 36, however, there may be instances where a single spring is used. For example, only one spring 178 may be needed to abut the conductive shaft 173. Additionally, there may be embodiments where a plurality of springs is used on each end of the rotating assembly 36, such as described in the preferred embodiment above. The illustrative springs 178 and 180 are a circular spring such as a wave washer. Other springs such as spring washers, wave springs, coil springs, and other such circular springs that are configured to interface with the rotating assembly 36 may be used.

Referring to FIG. 9 there is shown a sectional view of the S-hinge assembly 16. More particularly, the sectional view provides a view of the illustrative rotating assembly 36. As previously noted, the rotating assembly 36 enables the upper hinge arm 32 to rotate in relation to the lower hinge arm 34. In the illustrative example, the angle of rotation enables the wireless communication device 10 to rotate from a closed position to an open position.

The illustrative rotating assembly 36 comprises the housing 170 that interfaces with a follower 172, and a shaft 173 that interfaces with both. In the illustrative embodiment, the housing 170 is fixedly coupled to the upper hinge arm 32 and rotates with respect to follower 172 about the shaft 173. The housing 170 comprises an upper hinge end 182 and fastener 174 that is fixedly coupled to the upper hinge arm 32. The follower 172 comprises a lower hinge end 184 and fastener 176 that is fixedly coupled to the lower hinge arm 34.

The shaft 173 comprises a flange area or annular rim 186 that interfaces with the upper hinge end 182. The conductive spring 178 abuts or touches the flanged portion 184 of the shaft 173. Additionally, the conductive spring 178 abuts or touches a cap 186 associated with the upper hinge arm 32. On the opposite end of the shaft 173, the spring 180 interfaces with lower hinge end 184 and cap 188.

Adjacent to the housing 170 is a coiled spring 190 that provides tension to ease a user's opening and closing of the wireless communication device 10. The coiled spring 190 interfaces with a cam 192 that also interfaces with the follower 172. The coiled spring 190 and cam 192 operate to provide additional tension to the interface between the housing 170 and the follower 172 so the housing 170 rotates with respect to the follower 172.

The illustrative fasteners 174 and 176 described herein provides a much more robust mechanical solution that locks the housing 170 to the upper hinge arm 32 and locks the follower 172 to the lower hinge arm 34 with a stamped metal part such as a snap ring. Additionally, the conductive springs 178 and 180 such as wave washers located between the ends of the rotating assembly 36 that also interfaces with the upper hinge arm 32 and lower hinge arm 34, respectively, ensures a reliable ground path through the entire S-hinge assembly 16, which is critical for proper antenna performance.

It is to be understood that the detailed description of illustrative embodiments are provided for illustrative purposes. The scope of the claims is not limited to these specific embodiments or examples. For example, an S-hinge assembly 16 is described, however this solution may be extended to other hinge assembly that are implement with the wireless communication device described herein. Therefore, various structural limitations, elements, details, and uses can differ from those just described, or be expanded on or implemented using technologies not yet commercially viable, and yet still be within the inventive concepts of the present disclosure. The scope of the invention is determined by the following claims and their legal equivalents.

What is claimed is:

1. A hinge assembly for a wireless communication device that pivotally connects a display housing member to a keypad housing member, the hinge assembly comprising:
    an upper hinge arm that includes an upper hinge plate that is configured to be fixedly coupled to the display housing member at a single location that is adjacent to a first edge of the display housing member;
    a lower hinge arm that includes a lower hinge plate that is configured to be fixedly coupled to the keypad housing member at a single location that is adjacent to a first edge of the keypad housing member; and
    a rotating assembly includes an upper hinge end that is coupled to the upper hinge arm and a lower hinge end coupled to the lower hinge arm, the rotating assembly configured to enable the display housing member to rotate in relation to the keypad housing, the rotating assembly comprising,
    a first fastener disposed on the upper hinge end that is fixedly coupled to the upper hinge arm, the first fastener locking the rotating assembly to the upper hinge arm,
    a second fastener disposed on the lower hinge end that is fixedly coupled to the lower hinge arm, the second fastener locking the rotating assembly to the lower hinge arm, and
    at least one conductive spring that interfaces with at least one said hinge end, wherein the conductive spring provides a ground path between a first ground plane corresponding to the display housing member and a second ground plane corresponding to the keypad housing member.

2. The hinge assembly for a wireless communication device of claim 1 further comprising:
    an upper hinge aperture in the upper hinge arm that is configured to receive a wire bundle;
    a lower hinge aperture in the lower hinge arm that is configured to receive the wire bundle; and
    a hollow shaft disposed within the rotary assembly that is configured to receive the wire bundle.

3. The hinge assembly for a wireless communication device of claim 1 wherein the upper hinge arm further comprises a twisted conical shape with a hollow body, the twisted conical shape defined by an arcuate twisted end that is proximate to the first edge associated with the display housing member.

4. The hinge assembly for a wireless communication device of claim 1 wherein the upper hinge arm further comprises a twisted conical shape with a hollow body, the twisted conical shaped defined by an arcuate twisted end that is proximate to the first edge associated with the keypad housing member.

5. The hinge assembly for a wireless communication device of claim 1 wherein the rotating assembly is configured to rotate from a closed position, in which the display housing member is adjacent to the keypad housing member, to an open position, in which the display housing member is separated from the keypad housing member.

6. The hinge assembly for a wireless communication device of claim 1 wherein the first fastener and the second fastener are conductive and provide another ground path between the first ground plane and the second ground plane.

7. The hinge assembly for a wireless communication device of claim 1 wherein the at least one conductive spring comprises at least one wave washer that aligns the rotating assembly with the upper hinge arm and lower hinge arm.

8. The hinge assembly for a wireless communication device of claim 1 wherein the first fastener and the second fastener are each a snap ring that aligns the rotating assembly with the upper hinge arm and the lower hinge arm.

9. An S-hinge assembly for a wireless communication device that rotatably couples a display housing member to a keypad housing member, the S-hinge assembly comprising:
    a curved upper hinge arm that includes an upper hinge plate that is configured to be fixedly coupled to the display housing member at a single location that is adjacent to a first edge of the display housing member;
    a curved lower hinge arm that includes a lower hinge plate that is configured to be fixedly coupled to the keypad housing member at a single location that is adjacent to a first edge of the keypad housing member;

a rotating assembly includes an upper hinge end that is coupled to the curved upper hinge arm and a lower hinge end coupled to the curved lower hinge arm, the rotating assembly configured to enable the display housing member to rotate in relation to the keypad housing member, the rotating assembly comprising, a means for fastening the upper hinge end to the upper hinge arm to lock the rotating assembly to the upper hinge arm, a means for fastening the lower hinge end to the lower hinge arm to lock the rotating assembly to the lower hinge arm; and a means for enabling a ground path between a first ground plane corresponding to the display housing member and a second ground plane corresponding to the keypad housing member.

10. The S-hinge assembly for a wireless communication device of claim 9, wherein the means for fastening the upper hinge end to the upper hinge arm and the means for fastening the lower hinge end to the lower hinge arm, further comprise a snap ring that aligns the rotating assembly with the upper hinge arm and the lower hinge arm.

11. The S-hinge assembly for a wireless communication device of claim 10 wherein the curved upper hinge arm further comprises a twisted conical shape with a hollow body, the twisted conical shape defined by an arcuate twisted end that is proximate to the first edge associated with the display housing member.

12. The S-hinge assembly for a wireless communication device of claim 11 wherein the curved lower hinge arm further comprises a twisted conical shape with a hollow body, the twisted conical shaped defined by an arcuate twisted end that is proximate to the first edge associated with the keypad housing member.

13. The S-hinge assembly for a wireless communication device of claim 12 further comprising:

an upper hinge aperture in the upper hinge arm that is configured to receive a wire bundle;

a lower hinge aperture in the lower hinge arm that is configured to receive the wire bundle; and a hollow shaft disposed within the rotary assembly that is configured to receive the wire bundle.

14. The S-hinge assembly for a wireless communication device of claim 13 wherein the rotating assembly is configured to rotate from a closed position, in which the display housing member is adjacent to the keypad housing member, to an open position, in which the display housing member is separated from the keypad housing member.

15. The S-hinge assembly for a wireless communication device of claim 14 wherein the first fastener and the second fastener are conductive and provide an electrical contact that provides another ground path between the first ground plane and the second ground plane.

16. The S-hinge assembly for a wireless communication device of claim 15, wherein the means for enabling a ground path between the first ground plane and the second ground plane further comprises at least one wave washer.

17. A wireless communication device comprising:

a display housing member that comprises a first ground plane section;

a keypad housing member that comprises a second ground plane section; and a hinge assembly that rotatably couples the display housing member to the keypad housing member, wherein the hinge assembly comprises:

an upper hinge arm that includes an upper hinge plate that is fixedly coupled to the display housing member at a single location that is along a first edge of the display housing member, a lower hinge arm that includes a lower hinge plate that is fixedly coupled to the keypad housing member at a single location that is along a first edge of the keypad housing member, and a rotating assembly that includes an upper hinge side that is coupled to the upper hinge arm and a lower hinge side coupled to the lower hinge arm, wherein the rotating assembly enables the upper hinge arm to rotate in relation to the lower hinge arm, the rotating assembly further comprising, a first fastener disposed on the upper hinge side that is coupled to the upper hinge arm, the first fastener locking and aligning the rotating assembly to the upper hinge arm, a second fastener disposed on the lower hinge side that is coupled to the lower hinge arm, the second fastener locking and aligning the rotating assembly to the lower hinge arm, and at least one conductive spring that applies a lateral force for aligning the rotating assembly, the conductive spring providing a ground path between the first ground plane section and the second ground plane section.

18. The wireless communication device of claim 17 wherein the rotating assembly is configured to rotate from a closed position, in which the display housing member is adjacent to the keypad housing member, to an open position, in which the display housing member is separated from the keypad housing member.

19. The wireless communication device of claim 18 wherein the at least one conductive spring comprises at least one wave washer that aligns the rotating assembly with the upper hinge arm and lower hinge arm.

20. The wireless communication device of claim 18 further comprising:

an upper hinge aperture in the upper hinge arm that is configured to receive a wire bundle;

a lower hinge aperture in the lower hinge arm that is configured to receive the wire bundle; and a hollow shaft disposed within the rotary assembly that is configured to receive the wire bundle.

21. The wireless communication device of claim 18 wherein the upper hinge arm further comprises a twisted conical shape with a hollow body, the twisted conical shape defined by an arcuate twisted end that is proximate to the first edge of the display housing member.

22. The wireless communication device of claim 18 wherein the lower hinge arm further comprises a twisted conical shape with a hollow body, the twisted conical shaped defined by an arcuate twisted end that is proximate to the first edge of the keypad housing member.

* * * * *